United States Patent
Izumi et al.

(10) Patent No.: US 9,273,575 B2
(45) Date of Patent: Mar. 1, 2016

(54) POROUS MATERIAL, HONEYCOMB STRUCTURE, AND METHOD OF MANUFACTURING POROUS MATERIAL

(71) Applicant: NGK Insulators, Ltd., Nagoya (JP)

(72) Inventors: Yunie Izumi, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/196,411

(22) Filed: Mar. 4, 2014

(65) Prior Publication Data

US 2014/0290195 A1   Oct. 2, 2014

(30) Foreign Application Priority Data

Mar. 27, 2013  (JP) ................. 2013-066930

(51) Int. Cl.
  *B01D 39/06*   (2006.01)
  *B01D 39/20*   (2006.01)
  *B01D 39/14*   (2006.01)
  (Continued)

(52) U.S. Cl.
  CPC .......... *F01N 3/0222* (2013.01); *B01D 39/2075* (2013.01); *B01J 21/16* (2013.01); *B01J 23/002* (2013.01); *B01J 23/02* (2013.01); *B01J 23/04* (2013.01); *B01J 27/224* (2013.01); *B01J 27/24* (2013.01); *B01J 35/04* (2013.01); *C04B 35/185* (2013.01); *C04B 35/565* (2013.01); *C04B 35/587* (2013.01); *C04B 35/6303* (2013.01); *C04B 38/0006* (2013.01); *F01N 3/2828* (2013.01); *C04B 2235/3463* (2013.01); *C04B 2235/36* (2013.01)

(58) Field of Classification Search
  CPC ...... B01D 39/2075; B01J 12/16; B01J 23/002
  See application file for complete search history.

(56) References Cited

U.S. PATENT DOCUMENTS 5,195,319 A * 3/1993 Stobbe ........................... 60/303
5,322,537 A * 6/1994 Nakamura et al. .............. 55/523

(Continued)

FOREIGN PATENT DOCUMENTS

EP   0 336 883 AI   10/1989
EP   1 600 432 A1   11/2005

(Continued)

OTHER PUBLICATIONS

Extended European Search Report (Application No. 14159720.3) dated Jul. 7, 2014.

(Continued)

*Primary Examiner* — Amber R Orlando
(74) *Attorney, Agent, or Firm* — Burr & Brown, PLLC

(57) ABSTRACT

There is disclosed a porous material which has an improved thermal shock resistance. The porous material contains aggregates and a composite binder. The composite binder includes glass as a binder and mullite particles as reinforcing particles, and the mullite particles are dispersed in the glass. The aggregates are connected to each other by the composite binder in a state where pores are formed in the porous material. Preferably, a lower limit of a percentage of a content of the composite binder to a total mass of the aggregates and composite binder is 12 mass %, and an upper limit of the percentage of the content of the composite binder to the total mass of the aggregates and composite binder is 50 mass %. Preferably, the glass contains MgO, Al$_2$O$_3$ and SiO$_2$ and further contains at least one selected from a group consisting of Na$_2$O, K$_2$O and CaO.

17 Claims, 1 Drawing Sheet

(51) Int. Cl.

| | | |
|---|---|---|
| *B01D 50/00* | (2006.01) | |
| *B01D 24/00* | (2006.01) | |
| *F01N 3/022* | (2006.01) | |
| *C04B 35/185* | (2006.01) | |
| *C04B 35/565* | (2006.01) | |
| *C04B 35/587* | (2006.01) | |
| *C04B 35/63* | (2006.01) | |
| *C04B 38/00* | (2006.01) | |
| *B01J 21/16* | (2006.01) | |
| *B01J 23/00* | (2006.01) | |
| *B01J 23/02* | (2006.01) | |
| *B01J 23/04* | (2006.01) | |
| *B01J 27/224* | (2006.01) | |
| *B01J 27/24* | (2006.01) | |
| *B01J 35/04* | (2006.01) | |
| *F01N 3/28* | (2006.01) | |

(56) References Cited

U.S. PATENT DOCUMENTS

| | | | |
|---|---|---|---|
| 5,497,620 A * | 3/1996 | Stobbe | ............................ 60/303 |
| 2003/0148063 A1 | 8/2003 | Morimoto et al. | |
| 2005/0143255 A1 | 6/2005 | Morimoto et al. | |
| 2008/0057268 A1 * | 3/2008 | Lu et al. | ........................ 428/116 |
| 2008/0138568 A1 * | 6/2008 | Tomita et al. | ................. 428/116 |
| 2009/0065982 A1 | 3/2009 | Morimoto et al. | |
| 2010/0038308 A1 * | 2/2010 | Brundage | .................. 210/510.1 |
| 2011/0143928 A1 | 6/2011 | Dien-Barataud | |
| 2011/0185690 A1 | 8/2011 | Jousseaume et al. | |

FOREIGN PATENT DOCUMENTS

| | | |
|---|---|---|
| EP | 2 233 455 A1 | 9/2010 |
| EP | 2 644 582 A1 | 10/2013 |
| JP | 4111439 B | 7/2008 |
| JP | 4227347 B | 2/2009 |
| WO | 2013/146953 A1 | 10/2013 |
| WO | 2013/146954 AI | 10/2013 |

OTHER PUBLICATIONS

U.S. Appl. No. 13/849,695, filed Mar. 25, 2013, Izumi, Yunie.
U.S. Appl. No. 14/476,804, filed Sep. 4, 2014, Izumi, Yunie.
U.S. Appl. No. 14/476,813, filed Sep. 4, 2014, Izumi, Yunie.
U.S. Appl. No. 14/478,051, filed Sep. 5, 2014, Ichikawa, Shuichi.

* cited by examiner

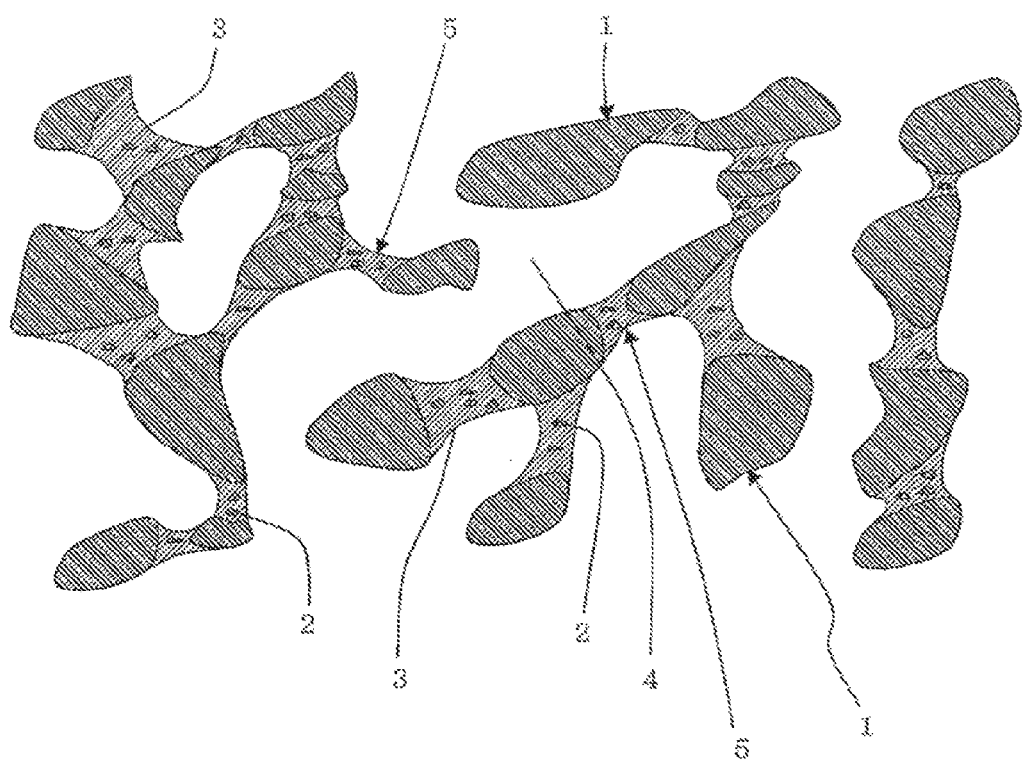

POROUS MATERIAL, HONEYCOMB STRUCTURE, AND METHOD OF MANUFACTURING POROUS MATERIAL

The present application is an application based on JP-2013-066930 filed on Mar. 27, 2013 with the Japanese Patent Office, the entire contents of which are incorporated herein by reference.

BACKGROUND OF THE INVENTION

1. Field of the Invention

The present invention relates to a porous material, a honeycomb structure, and a method of manufacturing the porous material. More specifically, the present invention relates to a porous material having a high thermal shock resistance, a honeycomb structure having a high thermal shock resistance, and a method of manufacturing such porous material.

2. Description of Related Art

A porous material that is made by binding silicon carbide particles with oxide phase or the like is excellent in thermal shock resistance, and therefore the porous material is used as, for example, a material for catalyst carrier or a material for a diesel particulate filter (DPF). Such porous material is disclosed in, for example, Japanese Patent No. 4111439 and No. 4227347.

SUMMARY OF THE INVENTION

In recent years, the sizes of the catalyst carrier and diesel particulate filter become larger, and their cell structures become complicated. In addition, the catalyst carrier and the diesel particulate filter are often used in more severe environments. Accordingly, a porous material used for such catalyst carrier and diesel particulate filter is desired to possess a higher thermal shock resistance.

The present invention intends to overcome the above-described problems, and a primary object of the present invention is to provide a porous material having a high thermal shock resistance, a honeycomb structure having a high thermal shock resistance, and a method of manufacturing such porous material.

In order to achieve these objects, the present invention provides a porous material, a honeycomb structure, and a method of manufacturing the porous material, which are described below respectively.

According to a first aspect of the present invention, there is provided a porous material that contains aggregates and composite binder. The composite binder includes glass as a binder and mullite particles as reinforcing particles such that the mullite particles are dispersed in the glass. The aggregates are connected to each other by the composite binder in a state where pores are formed in the porous material.

According to a second aspect of the present invention, there is provided a porous material that is defined by the first aspect, wherein a percentage of a mass of the composite binder to a total mass of the aggregates and composite binder is 12 mass % at minimum and 50 mass % at maximum.

According to a third aspect of the present invention, there is provided a porous material that is defined by the first or second aspect, wherein the glass contains MgO, $Al_2O_3$ and $SiO_2$ and further contains at least one that is selected from a group consisting of $Na_2O$, $K_2O$ and CaO.

According to a fourth aspect of the present invention, there is provided a porous material that is defined by any one of the first to third aspects, wherein a percentage of a mass of the mullite particles to a total mass of the aggregates and composite binder is 0.5 mass % at minimum and 15 mass at maximum.

According to a fifth aspect of the present invention, there is provided a porous material that is defined by any one of the first to fourth aspects, wherein the lower limit of the major length (major axis diameter) of the mullite particle, which is the reinforcing particle, is 0.5 micrometer, and the upper limit of the major length of the mullite particle is 35 micrometers.

According to a sixth aspect of the present invention, there is provided a porous material that is defined by any one of the first to fifth aspects, wherein the aggregates contain at least one of silicon carbide (SiC) particle and silicon nitride ($Si_3N_4$) particle.

According to a seventh aspect of the present invention, there is provided a porous material that is defined by any one of the first to sixth aspects, wherein the lower limit of the porosity is 40%, and the upper limit of the porosity is 90%.

According to an eighth aspect of the present invention, there is provided a porous material that is defined by any one of the first to seventh aspects, wherein the pores having a diameter less than 10 micrometers are included at 200 or less in the entire pores, and the pores having a diameter greater than 40 micrometers are included at 100 or less in the entire pores.

According to a ninth aspect of the present invention, there is provided a porous material that is defined by any one of the first to eight aspects, wherein the bending strength of the porous material is 6.5 MPa or more, and the ratio of the bending strength to the Young's modulus (bending strength/Young's modulus ratio) is $1.4 \times 10^{-3}$ or more.

According to a tenth aspect of the present invention, there is provided a porous material that is defined by any one of the first to ninth aspects, wherein the thermal expansion coefficient of the porous material is $4.6 \times 10^{-6}$/K or less.

According to a eleventh aspect of the present invention, there is provided a honeycomb structure configured by the porous material that is defined by any one of the first to tenth aspects, wherein the honeycomb structure has a partition wall that defines a plurality of cells extending from one end face to another (opposite) end face.

According to a twelfth aspect of the present invention, there is provided a honeycomb structure that is defined by the eleventh aspect, wherein the honeycomb structure has plugging portions at openings of predetermined cells situated at said one end face and another plugging portions at openings of the remaining cells situated at said another (opposite) end face.

According to a thirteenth aspect of the present invention, there is provided a method of fabricating a porous material that comprises the step of extruding a raw material for a forming process that contains an aggregate raw material, a composite binder raw material, a pore former and a binder to prepare a formed body, and the step of sintering the formed body in an inert atmosphere to fabricate the porous material. The lower limit of the sintering temperature in the sintering step is 1300 degrees C. and the upper limit of the sintering temperature is 1600 degrees C. The composite binder raw material contains an aluminum oxide component at more than 34.9 mass % and less than 71.8 mass %, a silicon dioxide component at more than 28.2 mass % and less than 52.0 mass %, and a magnesium oxide component at more than 5.00 mass % and less than 13.8 mass %.

The porous material and the honeycomb structure of the present invention have a greater thermal shock resistance than conventional porous materials and honeycomb structures.

The method of manufacturing porous material according to the present invention can provide such porous material.

BRIEF DESCRIPTION OF THE DRAWINGS

FIG. 1 is an enlarged schematic view of a cross section of a porous material according to one embodiment of the present invention.

DETAILED DESCRIPTION OF THE INVENTION

Embodiments of the present invention will now be described in detail below. It should be appreciated that the present invention is not limited to the below-described embodiments, and various changes and modifications may be made to the below-described embodiments by those skilled in the art without departing from the gist and scope of the invention.

(1) Porous Material

As shown in FIG. 1, an exemplary porous material according to one embodiment of the present invention contains aggregates 1 and composite binder 5. The composite binder 5 includes glass, which is a binder 3, and mullite particles, which are reinforcing particles 2 and dispersed in the glass. The composite binder 5 binds the aggregates 1, so that pores 4 are formed in the porous material. FIG. 1 schematically illustrates a cross section of the exemplary porous material 100 according to the present invention in an enlarged scale.

The porous material of the present invention has the above-described configuration, and therefore the porous material has a high absolute value of strength and a high "strength/Young's modulus" ratio. As such, the porous material of the present invention is excellent in thermal shock resistance. It should be noted that the "strength" in the "strength/Young's modulus" ratio is bending strength. In the porous material of the present invention, the mullite particle serves as the reinforcing particle. For example, when a crack occurs in the porous material, the mullite particle can prevent the progress of the cracking. The glass, which is used as the binder, may contain spinel particles and/or forsterite particles, in addition to or instead of the mullite particles. It should be noted that the spinel particles and the forsterite particles have a lower strength than the mullite particles, and are not able to serve as reinforcing particles. Because the mullite particles have a greater strength than the spinel particles and the forsterite particles, the mullite particles can stop the developments (expansion) of the cracking in the porous material and can function as reinforcing particles. Also, the spinel particles and the forsterite particles have a high thermal expansion coefficient so that the overall thermal expansion coefficient of the porous material becomes higher when the spinel particles and the forsterite particles are present in the binder. This deteriorates the thermal shock resistance of the porous material. Thus, the spinel particle and forsterite particle are not suitable as the reinforcing particle, and it is preferred that the spinel particle and forsterite particle are not contained in the porous material of the present invention.

In the porous material of the present invention, the aggregate are connected to each other by the composite binder such that pores are created in the porous material, as described earlier. The composite binder includes the mullite particles as reinforcing particles dispersed in the glass (or the binder). It should be noted that part of the aggregates may be dispersed in the binder. Also, the porous material may contain a metallic silicon, but it is preferred that the porous material does not contain any metallic silicon. The percentage of the mass of the metallic silicon to the total mass of the aggregates, composite binder and metallic silicon is preferably less than 15 mass %, more preferably equal to or less than 10 mass %, further preferably equal to or less than 2.5 mass %, and most preferably 0 mass (i.e., no metallic silicon is contained). Because the metallic silicon content is 15 mass % or less, the specific heat capacity is maintained high. This improves the thermal shock resistance. If the metallic silicon content is 15 mass % or more, then the specific heat capacity decreases and the thermal shock resistance may be deteriorated.

Preferably the composite binder has a crystalline component content of 50 mass % or less. In other words, preferably the composite binder has an amorphous component (glass component) content of 50 mass % or more. The quantity of the amorphous component (glass component) in the composite binder can be determined from analysis of X-ray diffraction data. Specifically, the ratio of the diffraction peak height of the (110) plane of the reference substance to the maximum height of the halo pattern representing the glass is calculated while an amount of the reference substance is being changed, and the calibration curve is drawn. Then, the X-ray diffraction of the measurement target is carried out, and the quantity of the amorphous component (glass component) contained in the measurement target is determined based on the analytical curve. For determination of the quantity of the mullite contained in the measurement target, the ratio of the diffraction peak height of the (110) plane of the mullite to the maximum height of the halo pattern representing the glass is calculated, and the calibration curve is drawn. Then, the X-ray diffraction of the measurement target is carried out, and the quantity of the mullite in the measurement target is determined based on the analytical curve. In the measuring process, the powder obtained from the porous material is used as a measurement sample, and the measurement is carried out with a rotating counter X-ray diffractometer (RINT manufactured by Rigaku Corporation, Japan). Preferably the reference substance is a substance that exists in the form of crystalline component (except for the mullite) in the composite binder. For example, cordierite is preferred when the cordierite is contained as the crystal phase.

In the porous material of the present invention, it is preferred that the glass contains MgO, $Al_2O_3$ and $SiO_2$, and further contains at least one selected from the group consisting of $Na_2O$, $K_2O$ and CaO. It is further preferred that the glass contains MgO, $Al_2O_3$ and $SiO_2$, and further contains at least one selected from the group consisting of $Na_2O$ and CaO. Various approaches may be used to include $Na_2O$, $K_2O$ and CaO in the glass. For example, a compound containing Na, K and Ca (e.g., $Na_2CO_3$, $K_2CO_3$ and $CaCO_3$) may be added to the raw material. Alternatively, the raw material for the glass to be used may contain Na, K and Ca. Alternatively, Na, K and Ca may coexist in a sintering atmosphere when the formed body is sintered. Respective contents of $Na_2O$, $K_2O$ and CaO in the final product can be controlled by amounts of additives, their concentrations in the raw material, and/or their concentrations in the sintering atmosphere.

The porous material of the present invention may contain sodium (Na) at less than 0.4 mass %, in terms of an oxide, to the entire porous material. The porous material of the present invention may contain potassium (K) at less than 0.4 mass %, in terms of an oxide, to the entire porous material. The porous material of the present invention may contain calcium (Ca) at less than 0.4 mass %, in terms of an oxide, to the entire porous material. The mass of the sodium in terms of an oxide is a mass of $Na_2O$ based on a presumption that the entire sodium exists in the form of $Na_2O$. The mass of the potassium in terms of an oxide is a mass of $K_2O$ based on a presumption that the entire potassium exists in the form of $K_2O$. The mass of the calcium in terms of an oxide is a mass of CaO based on a presumption that the entire calcium exists in the form of CaO. When the content of each of sodium, potassium and calcium is less than 0.4 mass % with respect to the entire porous material, the properties and characteristics of the porous material are not affected by the sodium, potassium and calcium. It should also be noted that Fe may be contained at less than 2.0 mass % in terms of an oxide, and Ti may be contained at less than 0.4 mass % in terms of an oxide. The contents of sodium (Na), potassium (K), calcium (Ca), iron (Fe) and titanium (Ti) in the porous material are measured by an ICP (Inductively Coupled Plasma)-AES (atomic emission spectrometry) method.

In the porous material of the present invention, the aggregates preferably contain at least one of silicon carbide (SiC) particle and silicon nitride ($Si_3N_4$) particle. Preferably the aggregates are the silicon carbide (SiC) particles or the silicon nitride ($Si_3N_4$) particles, and more preferably the aggregates are the silicon carbide (SiC) particles. Embodiments of the porous material and the honeycomb structure will be described with the aggregates being the silicon carbide particles, but it should be noted that the porous material and the honeycomb structure of the present invention are not limited to such embodiments. When the aggregates are the silicon nitride particles, the porous material and the honeycomb structure of the present invention preferably have the same or similar conditions as in the case where the aggregates are the silicon carbide particles.

The lower limit of the porosity of the porous material of the present invention is preferably 40%, and more preferably 50%. The upper limit of the porosity of the porous material of the present invention is preferably 90%, and more preferably 70%. When the porosity is less than 40%, the pressure loss may become large. In particular, when the porosity is 50% or more, the pressure loss is low and therefore the porous material is suitable for use in a diesel particulate filter (DPF) or the like. When the porosity is greater than 90%, the strength of the porous material may decrease. In particular, when the porosity is 70% or less, the strength is high and therefore the porous material is suitable for use in a diesel particulate filter (DPF) or the like. In this specification, the porosity is a value calculated from a total pore volume ($cm^3/g$) in accordance with the mercury press-in method (based on JIS (Japanese Industrial Standard) R 1655) and an apparent density ($g/cm^3$) measured in accordance with the Archimedes method. When the porosity is calculated, the following equation is used: porosity (%)=total pore volume/{(1/apparent density)+total pore volume}×100. It should be noted that the porosity may be adjusted by, for example, the amount of a pore former used when the porous material is manufactured, a sintering additive, a sintering atmosphere, and the like. Also, the porosity may be adjusted by a ratio of the aggregate to the composite binder.

The lower limit of an average pore diameter of the porous material of the present invention is preferably 10 micrometers, and more preferably 15 micrometers. The upper limit of the average pore diameter of the porous material is preferably 40 micrometers, more preferably 30 micrometers, and most preferably 25 micrometers. When the average pore diameter is less than 10 micrometers, the pressure loss may become large. When the average pore diameter is greater than 40 micrometers and the porous material of the present invention is used in the diesel particulate filter or the like, then part of the particulate matters in the exhaust gas may not be filtered by the diesel particulate filter or the like and may pass through the diesel particulate filter or the like. In this specification, the average pore diameter is a value measured in accordance with the mercury press-in method (based on JIS R 1655).

In the porous material of the present invention, preferably those pores which have a pore diameter less than 10 micrometers are 20% or less of the entire pores, and preferably those pores which have the pore diameter greater than 40 micrometers are 10% or less of the entire pores. If those pores which have the pore diameter less than 10 micrometers exist at greater than 20% of the entire pores, the pressure loss may easily increase because the pores having the pore diameter less than 10 micrometers tend to clog when loading the catalyst. If the pores having the pore diameter greater than 40 micrometers exist at greater than 10% of the entire pores, the diesel particulate filter or the like may not be able to sufficiently demonstrate the filtering function because the pores having the pore diameter greater than 40 micrometers are easier for the particulate matters to pass therethrough.

The lower limit percentage of the content of the composite binder to the total mass of the aggregates and composite binder is preferably 12 mass %, more preferably 17 mass %, and particularly preferably 20 mass %. The upper limit percentage of the content of the composite binder to the total mass of the aggregates and composite binder is preferably 50 mass %, more preferably 40 mass %, and particularly preferably 35 mass %. When the content (mass) percentage of the composite binder is less than 12 mass %, the bending strength of the porous material may decrease, the "strength/Young's modulus" ratio may also decrease, and the thermal shock resistance may decrease. When the content (mass) percentage of the composite binder is greater than 50 mass %, the porosity of the porous material may become small.

The content of the aggregates in the porous material can be obtained in the following manner. When the aggregate is silicon carbide (silicon carbide particle), chemical analysis (ICP-AES: Inductively Coupled Plasma Atomic Emission Spectrometry) is carried out and the amount of silicon carbide is calculated on the assumption that all the quantified carbon (C) derive from the silicon carbide. When the aggregate is silicon nitride (silicon nitride particle), the amount of silicon nitride is calculated on the assumption that all the nitrogen (N) that is quantified by a method based on "JIS R 1603" derive from the silicon nitride.

The content of the composite binder in the porous material is obtained in the following manner. When metallic silicon is not contained in the composite binder, the porous material is assumed to contain only the aggregates and the composite binder. Then, the content of the composite binder is calculated by subtracting the content of the aggregates from the porous material. When the metallic silicon is contained in the composite binder, the content of the composite binder is obtained in the following manner. Firstly, the amount of oxide that is contained in components other than Si is calculated by the chemical analysis (ICP-AES). Then, the amount of oxygen, which is contained in the oxide except for Si, is subtracted from the amount of oxygen (O) quantified by the chemical analysis. The resulting amount of oxygen (O) is assumed to be all oxygen (O) in $SiO_2$, and the amount of $SiO_2$ is calculated. Subsequently, Si contained in the $SiO_2$ is subtracted from the amount of Si that is obtained by the chemical analysis, and the resulting amount of Si is assumed to be the amount of metallic silicon. The sum of the amount of aggregates (SiC, $Si_3N_4$) and the amount of metallic silicon is subtracted from the entire porous material, and the resulting value is taken as the content of the composite binder.

The lower limit percentage of the content (mass) of the mullite particles to the total mass of the aggregates and composite binder is preferably 0.5 mass %. The upper limit percentage of the content (mass) of the mullite particles to the total mass of the aggregate and composite binder is preferably 15 mass %. More preferably the lower limit percentage of the content (mass) of the mullite particles to the total mass of the aggregates and composite binder is 0.9 mass %. The upper limit percentage of the content (mass) of the mullite particles to the total mass of the aggregates and composite binder is more preferably 8.0 mass %, and particularly preferably 4.5 mass %. If the content (mass) percentage of the mullite particles to the total mass of the aggregates and composite binder (hereinafter, may be referred to as "mullite particle content percentage") is less than 0.5 mass %, then the strength/Young's modulus ratio may decrease and the thermal shock resistance may decrease. If the mullite particle content percentage exceeds 15 mass %, then the strength/Young's modulus ratio may decrease and the thermal shock resistance may decrease. The mullite particles are contained in the composite binder and serves as reinforcing particles.

The mullite particle content percentage is a value obtained from a value obtained by the X-ray diffraction analysis. Specifically, the ratio of the diffraction peak height of the (110) plane of the mullite to the maximum height of the halo pattern representative of the glass is calculated, and the calibration curve is drawn. Then, the X-ray diffraction of the measurement sample is carried out, and the content percentage of the mullite in the composite binder is obtained from the calibration curve. The powdered particle of the porous material may be used as the measurement sample, and the measurement may be carried out with a rotating counter X-ray diffractometer (RINT manufactured by Rigaku Corporation, Japan). The amount (mass) of the mullite is obtained by multiplying the amount of composite binder by the mullite content percentage (its content percentage in the composite binder). The resulting amount (mass) of the mullite is divided by the total mass of the aggregates and composite binder to obtain the mullite particle content percentage.

In the porous material of the present invention, the lower limit of the average particle diameter of the silicon carbide particles, as the aggregates, is preferably 5 micrometers and more preferably 10 micrometers. The upper limit of the average particle diameter of the silicon carbide particles, as the aggregates, is preferably 100 micrometers and more preferably 40 micrometers. If the average particle diameter of the silicon carbide particles is smaller than 5 micrometers, the sintering shrinkage (burning shrinkage) may become large and the porosity of the sintered body may become lower than 40%. Also, those pores which have a diameter less than 10 micrometers may exist at 20% or more in the entire pores of the sintered body. If the average particle diameter of the silicon carbide particles is larger than 100 micrometers, then those pores which have a diameter larger than 40 micrometers may exist at 10% or more in the entire pores of the sintered body. When the porous material is formed to a honeycomb structure, such silicon carbide particles may cause clogging at the die. This would result in defects in the forming process. In the porous material of the present invention, the average particle diameter of the silicon carbide, which is the aggregate, is greater than the average particle diameter of the mullite particles, which are the reinforcing particles. Preferably, the average particle diameter of the silicon carbide, which is the aggregate, is 1.5 times or more greater than the average particle diameter of the mullite particles, which are the reinforcing particles. The upper limit of the magnification factor (scale factor) of the average particle diameter of the silicon carbide, which is the aggregate, to the average particle diameter of the mullite particles, which are the reinforcing particles, is preferably 40 times. If the average particle diameter of the silicon carbide is smaller than 1.5 times the average particle diameter of the mullite particles, then connection points between the silicon carbide and the binder may decrease and insufficient sintering may take place. This would significantly decrease the bending strength and deteriorate the thermal shock resistance.

In the porous material of the present invention, the aspect ratio of the mullite particle is preferably 1.5 or more. The lower limit of the aspect ratio of the mullite particle is more preferably 1.8, and particularly preferably 2.1. The upper limit of the aspect ratio of the mullite particle is preferably 4.7, and more preferably 4.2. If the aspect ratio is smaller than 1.5, then the function of the mullite particle as the reinforcing particle may become weak so that the bending strength may decrease. The bending strength/Young's modulus ratio may also decrease and the thermal shock resistance may decrease. It should be noted that if the aspect ratio is greater than 4.7, the shape of the mullite particle is planar (sheet shaped) or fibrous. The aspect ratio of the mullite particle is a value measured with an SEM (scanning electron microscope). Specifically, the porous material of the present invention enclosed by resin is mirror polished with a diamond slurry or the like, and the resulting material is used as an observation sample. Then, a polished cross-sectional surface of the sample is observed with 3000 magnifications and microstructure photographs are taken. The major lengths and the minor lengths of all the mullite particles in a microstructure photograph are measured, and the "major length/minor length" ratio is calculated. This ratio is averaged by the number of the mullite particles in the microstructure photograph, and the resulting value is taken as the aspect ratio of the mullite.

In the porous material of the present invention, the lower limit of the major length of the mullite particle is preferably 0.5 micrometer, more preferably 1.8 micrometers, and particularly preferably 2.0 micrometers. The upper limit of the major length of the mullite particle is preferably 35 micrometers, and more preferably 30.1 micrometers. If the major length of the mullite particle is shorter than 0.5 micrometer, then the mullite particle may be difficult to function as the reinforcing particle and therefore the bending strength may decrease. Also, the strength/Young's modulus ratio may decrease and the thermal shock resistance may decrease. If the major length of the mullite particle is longer than 35 micrometers, then the mullite particle may function as defects, not as the reinforcing particle, and therefore the bending strength may decrease. Also, the strength/Young's modulus ratio may decrease and the thermal shock resistance may decrease.

Preferably the porous material of the present invention has the bending strength of 6.5 MPa or more, and the bending strength (Pa)/Young's modulus (Pa) ratio is $1.4 \times 10^{-3}$ or more. More preferably the lower limit of the bending strength of the porous material is 7.0 MPa, and the lower limit of the bending strength (Pa)/Young's modulus (Pa) ratio is $1.5 \times 10^{-3}$. More preferably the upper limit of the bending strength of the porous material is 25.0 MPa, and the upper limit of the bending strength (Pa)/Young's modulus (Pa) ratio is $5.0 \times 10^{-3}$. By having the bending strength and the bending strength (Pa)/Young's modulus (Pa) ratio in the above-mentioned ranges, it is possible to improve the thermal shock resistance of the porous material. The bending strength is generally desired to be as high as possible, but the upper limit is approximately 50 MPa when the configuration of the porous material of the present invention is taken into account. In the present specification, the bending strength is a value measured in accordance with the bending test based on JIS R1601. In the present specification, the Young's modulus is a value calculated from the stress-strain curve, which is obtained in the above-mentioned bending test.

Preferably the thermal expansion coefficient (linear thermal expansion coefficient) of the porous material of the present invention is equal to or lower than $4.6 \times 10^{-6}$/K at 40-800 degrees C. Preferably the lower limit of the linear thermal expansion coefficient of the porous material is $2.0 \times 10^{-6}$/K at 40-800 degrees C. More preferably the upper limit of the linear thermal expansion coefficient of the porous material is $3.9 \times 10^{-6}$/K at 40-800 degrees C. If the linear thermal expansion coefficient is higher than $4.6 \times 10^{-6}$/K, the thermal shock resistance may decrease. It should be noted that the linear thermal expansion coefficient is generally desired to be as small as possible, but the lower limit of the linear thermal expansion coefficient is $2.0 \times 10^{-6}$/K when the configuration of the porous material of the present invention is taken into account. In the present specification, the thermal expansion coefficient is a value measured by a method based on JIS R1618.

(2) Honeycomb Structure

The honeycomb structure of the present invention is configured with the above-described porous material of the present invention, and has a partition wall that defines a plurality of cells extending from one end face to another end face. The cells serve as through channels or passages for a fluid. Preferably the honeycomb structure is configured to have an outer peripheral wall at the outermost periphery. The lower limit of the partition wall thickness is preferably 30 micrometers and more preferably 50 micrometers. The upper limit of the partition wall thickness is preferably 1000 micrometers, more preferably 500 micrometers and particularly preferably 350 micrometers. The lower limit of the cell density is preferably 10 cells/cm$^2$, more preferably 20 cells/cm$^2$, and particularly preferably 50 cells/cm$^2$. The upper limit of the cell density is preferably 200 cells/cm$^2$, and more preferably 150 cells/cm$^2$.

The shape of the honeycomb structure is not limited to a particular shape, and may be a cylindrical shape, a tubular shape having a polygonal bottom (e.g., triangular bottom, quadrangular bottom, pentagonal bottom, hexagonal bottom) or any other suitable shape.

The shape of the cell of the honeycomb structure is not limited to a particular shape. For example, the shape of the cross section perpendicular to the cell extending direction may be a polygon (e.g., triangle, quadrangle, pentagon, hexagon, heptagon, or octagon), a circle, combination thereof or any other suitable shape.

The size of the honeycomb structure may be decided (selected) in accordance with desired use. Because the honeycomb structure of the present invention is configured with the porous material of the present invention, the honeycomb structure is excellent in thermal shock resistance. Accordingly, it is possible for the honeycomb structure to have a larger size. The lower limit of the honeycomb structure size may be, for example, approximately 10 cm$^3$. The upper limit of the honeycomb structure size may be, for example, approximately $2.0 \times 10^4$ cm$^3$.

The honeycomb structure of the present invention may be used as a diesel particulate filer (DPF) or a catalyst carrier or carrier. It is also preferred to load the catalyst onto the diesel particulate filter. When the honeycomb structure of the present invention is used as the diesel particulate filter or the like, the following structure is preferably employed. Specifically, it is preferred that the honeycomb structure has plugging portions at openings of predetermined cells at one end face, and another plugging portions at openings of the remaining cells at another (or opposite) end face. It is preferred that those cells having the plugging portions and those cells having no plugging portions are alternately arranged at the two end faces to form a checkered pattern.

A preferred range of the thermal expansion coefficient (linear thermal expansion coefficient) of the honeycomb structure of the present invention is the same as the preferred range of the thermal expansion coefficient (linear thermal expansion coefficient) of the porous material of the present invention. The thermal expansion coefficient (linear thermal expansion coefficient) of the honeycomb structure of the present invention is a value measured in the following manner. Specifically, a sample piece of 3-cell (height)×3-cell (wide)×20 mm (length) was cut out from the honeycomb structure, and the thermal expansion coefficient of this sample was measured in the A axis direction (parallel to the through channels of the honeycomb structure) at 40-800 degrees C.

(3) Method of Manufacturing Porous Material (Honeycomb Structure)

A method of manufacturing the porous material according to the present invention will be described below. The method of manufacturing the porous material that will be described below is also a method of manufacturing the honeycomb structure that is constituted by the porous material.

The method of manufacturing the porous material of the present invention includes a forming step and a sintering step. The forming step is a step of extruding a forming raw material which contains an aggregate raw material, a composite binder raw material, a pore former and a binder to prepare a formed body. The sintering step is a step of sintering the formed body in an inert atmosphere at 1400-1500 degrees C. to fabricate the porous material. The composite binder raw material contains an aluminum oxide component at more than 34.9 mass % and less than 71.8 mass %, a silicon dioxide component at more than 28.2 mass % and less than 52.0 mass %, and a magnesium oxide component at more than 5.00 mass % and less than 13.8 mass %.

The method of manufacturing the porous material of the present invention will now be described step by step.

Firstly, the raw material of the aggregates, which will become the aggregates, is mixed with the raw material powder of the composite binder, which will become the composite binder upon sintering, and if necessary, the binder, a surfactant, the pore former, water and other agents are added to make the forming raw material. Preferably the raw material of the aggregates contains at least one of the silicon carbide (SiC) and the silicon nitride (Si$_3$N$_4$). The raw material of the composite binder becomes the mullite particles, which is the reinforcing particles, and the glass, which is the binder, upon sintering. As described above, the raw material of the composite binder preferably contains an aluminum oxide (Al$_2$O$_3$) component at more than 34.9 mass % and less than 71.8 mass %. Also, the raw material of the composite binder preferably contains a silicon dioxide (SiO$_2$) component at more than 28.2 mass and less than 52.0 mass %. Further, the raw material of the composite binder preferably contains a magnesium oxide (MgO) component at more than 5.00 mass and less than 13.8 mass %. By limiting the percentages of the aluminum oxide component, the silicon dioxide component and the magnesium oxide component in the raw material of the composite binder to the above-mentioned ranges respectively, it is possible to provide the mullite particles that serve as the reinforcing particles and the glass that serves as the binder upon sintering. The aluminum oxide component is the aluminum oxide, or the aluminum and oxygen, which give the composition ratio of the aluminum oxide in the raw material containing aluminum and oxide. Such raw materials include, for example, aluminum hydroxide, kaolin, boehmite or feldspar. The mass of the aluminum oxide component is the mass of the aluminum, in terms of an oxide, in the aluminum oxide component (i.e., the mass of $Al_2O_3$). When the aluminum oxide component is the aluminum oxide, the lower limit of the average particle diameter is preferably 2.5 micrometers and the upper limit of the average particle diameter is preferably 15.0 micrometers. The aluminum oxide is preferably alpha-alumina. The silicon dioxide component is the silicon dioxide, or the silicon and oxygen, which give the composition ratio of the silicon dioxide in a raw material containing silicon and oxide. Such raw materials include, for example, talc, kaolin or feldspar. The magnesium oxide component is the magnesium oxide, or the magnesium and oxygen, which give the composition ratio of the magnesium oxide in the raw material containing magnesium and oxide. Such raw materials include, for example, magnesium hydroxide or talc. The raw material powder of the composite binder preferably contains, as the raw material of the aluminum component (aluminum (Al) source), Al—Si fiber, $Al_2O_3$ fiber, tabular alumina (alumina flake), coarse $Al_2O_3$ particle, kaolin or the like. The Al—Si fiber is also a raw material for the silicon dioxide component. The lower limit of the major length of the tabular alumina is preferably 0.5 micrometer. The upper limit of the major length of the tabular alumina is preferably 15 micrometers. The lower limit of the minor length (thickness) of the tabular alumina is preferably 0.01 micrometer. The upper limit of the minor length (thickness) of the tabular alumina is preferably 1 micrometer. The lower limit of the width of the tabular alumina is preferably 0.05 micrometer. The upper limit of the width of the tabular alumina is preferably 70 micrometers. The lower limit of the aspect ratio of the tabular alumina is preferably 5. The upper limit of the aspect ratio of the tabular alumina is preferably 70. The length of the alumina fiber is preferably equal to or shorter than 200 micrometers. The minor length of the alumina fiber is preferably equal to or shorter than 3 micrometers. The aspect ratio of the alumina fiber is preferably equal to or greater than 3. The average particle diameter of the coarse $Al_2O_3$ is preferably 2.5 to 15 micrometers. The raw material (magnesium (Mg) source) of the magnesium (Mg) component is preferably MgO or $Mg(OH)_2$. The raw material (silicon (Si) source) of the silicon (Si) component is preferably kaolin, powdered silica or colloidal silica. The major length and the minor length are values measured from images of the raw material powder, which are observed with SEM. More specifically, the SEM is used to observe a 1500-fold magnification image (image of the sample) in three visual fields. In the observation of each visual field, all particles in the visual field are observed. The major lengths (major axis diameters) and minor lengths (minor axis diameters) of all the particles in the three visual fields are averaged to obtain the above-mentioned major length and minor length. The average particle diameter is a value measured by the laser diffraction method.

More preferably the raw material of the aggregates is the silicon carbide (SiC) powder or the silicon nitride ($Si_3N_4$) powder. The lower limit of the average particle diameter of the aggregate raw material is preferably 5 micrometers and more preferably 10 micrometers. The upper limit of the average particle diameter of the aggregate raw material is preferably 100 micrometers and more preferably 40 micrometers. The average particle diameter is a value measured by the laser diffraction method.

The binder may include organic binders such as methyl cellulose, hydroxypropoxyl cellulose, hydroxyethyl cellulose, carboxymethyl cellulose or polyvinyl alcohol. Among those, the methyl cellulose and hydroxypropoxyl cellulose are preferably used together. The content of the binder is preferably 2 to 10 mass % to the entire forming raw material.

The surfactant may be ethylene glycol, dextrin, fatty acid soap, polyalcohol or the like. One or suitable combinations of these may be used as the surfactant. The content of the surfactant is preferably equal to or less than 2 mass to the entire forming raw material.

The pore former is not limited to a particular substance as long as it provides pores after the sintering. For example, the pore former may be graphite, starch, foamed resin, water-absorbable resin or silica gel. The content of the pore former is preferably equal to or less than 10 mass % to the entire forming raw material. The lower limit of the average particle diameter of the pore former is preferably 10 micrometers. The upper limit of the average particle diameter of the pore former is preferably 30 micrometers. If the (average) particle diameter of the pore former is smaller than 10 micrometers, pores may not sufficiently be formed. If the average particle diameter of the pore former is larger than 30 micrometers, the pore former may clog at the die during the forming process. The average particle diameter of the pore former is a value measured by the laser diffraction method. It should be noted that when the pore former is the water-absorbable resin, the average particle diameter is a value after water absorption.

The content of water is appropriately adjusted to a value that provides an easy-to-form clay hardness, and it is preferred that the content of water is 20-80 mass % to the entire forming raw material.

Then, the forming raw material is kneaded to form the clay (green body). The method of kneading the forming raw material to prepare the clay is not limited to a particular method. For example, the method of kneading the forming raw material to prepare the clay may be performed with a kneader or a vacuum pugmill.

Subsequently, the clay is extruded to form the honeycomb formed body (formed body). This is still the forming step. It should be noted that the clay is conceptually included in the forming raw material. Preferably the extrusion process is carried out with the die that has or can provide a desired entire shape, a desired cell shape, a desired partition wall thickness, a desired cell density and the like. The material of the die is preferably a cemented carbide or ultra hard metal which is resistive to wear. The honeycomb formed body has a porous partition wall to define a plurality of cells, which serve as fluid passages, and an outer peripheral wall at the outermost peripheral portion. The thickness of the partition wall, the cell density, the thickness of the outer peripheral wall and other dimensions of the honeycomb formed body are appropriately decided to conform to the desired structure of the honeycomb structure to be manufactured, while taking into account the shrinkages upon drying and sintering. This is the forming step for forming the formed body through the process of extruding the forming raw material which contains the aggregate raw material, composite binder raw material, pore former and binder.

It is preferred that the honeycomb formed body that is prepared in the above-described manner is subjected to the drying process prior to the sintering process. The drying method is not limited to a particular method. For example, the drying may be carried out by an electromagnetic wave heating such as microwave heating or high frequency dielectric heating, or by an external device heating such as hot air drying or superheated steam drying. Among these, it is preferred that the electromagnetic wave heating is firstly used to dry out a certain amount of water (moisture component) and then the external device heating is used to dry out the remaining water because such approach can quickly and uniformly dry the entire formed body without causing cracking. Regarding the drying conditions, the electromagnetic wave heating is carried out to remove the water by 30 to 99 mass % with respect to the water prior to the drying, and then the external device heating is carried out to remove the water to 3 mass % or less. The electromagnetic wave heating is preferably performed with the dielectric heating, and the external device heating is preferably performed with the hot air drying.

If the length of the honeycomb formed body in the cell extending direction of the cell is not the desired length, then it is preferred that both end faces (both end portions) are cut to have the desired length. The cutting method is not limited to a particular method. For example, the cutting may be carried out with a circular saw cutting machine or the like.

Subsequently, the honeycomb formed body (formed body) is sintered to make the honeycomb structure (porous material). This is the sintering step. Prior to the sintering, the calcination is preferably carried out to remove the binder and other substances. Preferably the calcination is carried out for 0.5 to 20 hours at 200 to 600 degrees C. in the atmosphere. Preferably the sintering is carried out in a unoxidizing atmosphere (inert atmosphere) such as nitrogen or argon, with the oxygen partial pressure being equal to or lower than $10^{-4}$ atmospheric pressure. Preferably the lower limit of the sintering temperature is 1300 degrees C. Preferably the upper limit of the sintering temperature is 1600 degrees C. Preferably the sintering temperature is 1400 to 1500 degrees C. Preferably the pressure during the sintering process is an ordinary pressure. Preferably the lower limit of the sintering time is 1 hour. Preferably the upper limit of the sintering time is 20 hours. Such step of sintering the formed body in the inert atmosphere at the predetermined temperature to fabricate the porous material is the sintering step. After the sintering, an oxidation treatment may be performed in the atmosphere, which may contain moisture or water vapor, to improve the durability of the porous material. Preferably the lower limit of the oxidation treatment temperature is 1100 degrees C. Preferably the upper limit of the oxidation treatment temperature is 1400 degrees C. Preferably the lower limit of the oxidation treatment time is one hour. Preferably the upper limit of the oxidation treatment time is 20 hours. It should be noted that the calcination and sintering may be carried out with an electric furnace, a gas furnace or the like.

EXAMPLES

The present invention will be described below by way of examples. It should be noted, however, that the present invention is not limited to these examples.

Example 1

The silicon carbide (SiC) powder and the raw material powder of the composite binder were mixed at the ratio of 95.0 to 5.0 (mass ratio) to prepare a mixed powder. A powder containing aluminum hydroxide by 48.8 mass %, talc by 31.3 mass % and silica by 20.0 mass % was used as the raw material powder of the composite binder. The composition of the raw material of the composite binder (composite binder raw material) and respective components are shown in Table 3. The content of the aluminum oxide component in the raw material (powder) of the composite binder was 39.0 mass %. The content of the silicon dioxide component in the raw material (powder) of the composite binder was 48.7 mass %. The content of the magnesium oxide component in the raw material (powder) of the composite binder was 12.2 mass %. Hydroxypropyl methylcellulose, starch, water-absorbable resin and water were added to the mixed powder to prepare a forming raw material. Hydroxypropyl methylcellulose was used as a binder, and starch was used as a pore former. The content of the binder was 7 parts by mass when the content of the mixed powder was taken as 100 parts by mass. The content of the pore former was 12 parts by mass when the content of the mixed powder was taken as 100 parts by mass. The content of the water was 70 parts by mass when the content of the mixed powder was taken as 100 parts by mass. The average particle diameter of the silicon carbide powder was 22.0 micrometers. The average particle diameter of the pore former was 20 micrometers. The average particle diameters of the silicon carbide powder and the pore former were measured by a laser diffraction method.

The forming raw material was kneaded to prepare a column-shaped clay. The resulting column-shaped clay was formed into a honeycomb shape by an extruder to prepare a honeycomb formed body. The honeycomb formed body was dried by dielectric heating, and then dried by a hot gas dryer for two hours at 120 degrees C. to obtain a honeycomb dried body.

The resulting honeycomb dried body was degreased for three hours at 550 degrees C. in the atmosphere. Subsequently, the honeycomb dried body was sintered for two hours at about 1450 degrees C. in the Ar inert atmosphere to obtain a honeycomb sintered body. The honeycomb sintered body was subjected to the oxidation treatment for four hours at 1200 degrees C. to obtain a honeycomb structured porous material (honeycomb structure).

The resulting honeycomb structure had a partition wall thickness of 300 micrometers and a cell density of 46.5 cells/ $cm^2$. The thickness of the outer peripheral wall of the honeycomb structure was 1.0 mm. The outer peripheral wall was formed together with the partition wall by the above-described sintering. The honeycomb structure had a quadrangular bottom, with its one side being 35 mm. The honeycomb structure had a length of 50 mm in the cell extending direction.

Identification of silicon carbide (or silicon nitride), mullite and glass of the honeycomb structure (porous material) was carried out. The identification of silicon carbide (or silicon nitride), mullite and glass was performed by means of EPMA-based qualitative and quantitative analysis and element mapping results, together with the identification of constituent phases by means of powder X-ray diffraction. This revealed that the honeycomb structure contained silicon carbide (or silicon nitride), mullite and glass. The glass components are shown in Table 2. In Table 2, the CaO content and $Na_2O$ content indicate content percentage of CaO and $Na_2O$ in the entire porous material, respectively.

The aspect ratio of the mullite particle was 3.4. The major length of the mullite particle was 2.3 micrometers. The content of mullite was 1.0 mass %. The content of the composite binder in the porous material was 5.0 mass %. The major length and aspect ratio of the mullite particle were measured by the below-described method. The content of the mullite particle was measured by the below-described method. The content of the metallic silicon in the obtained porous material was 0.00 mass %, and therefore no metallic silicon was contained.

The porosity of the porous material having the honeycomb structure (honeycomb structure) was 65.0%, and the average pore diameter was 18.0 micrometers. The volume percentage of those pores which had a diameter equal to or less than 10 micrometers was 16.5%. The volume percentage of those pores which had a diameter equal to or less than 40 micrometers was 4.8%. The bending strength of the honeycomb structure was 3.1 MPa, the Young's modulus of the honeycomb structure was 1.6 GPa, and the strength/Young's modulus ratio was $1.9 \times 10^{-3}$. It should be noted that the "strength" of the "strength/Young's modulus ratio" is the bending strength. The thermal expansion coefficient of the honeycomb structure was 4.6 ppm·K$^{-1}$ at 40-800 degrees C. The specific heat capacity of the honeycomb structure was 2.20 J/(cm$^3$·K). The obtained results were shown in Table 1. It should be noted that the respective measurement values were obtained by the below-described methods.

In Table 1, the column of the "Binder" indicates the mass percentages (mass %) of the respective components of the composite binder and their sum to a total mass of the silicon carbide particle and composite binder. It should be noted that the composite binder is simply represented by the term "Binder" in each of the tables. The column of the "Metallic Silicon" indicates the content of the metallic silicon to a total mass of the silicon carbide particle, composite binder and metallic silicon. The column of the "Mullite Aspect Ratio" indicates the aspect ratio of the mullite particle in the porous material. The column of the "Mullite Major Length" indicates the major length of the mullite particle in the porous material. The columns of the "Porosity" and "Average Pore Diameter" indicate the porosity of the porous material and the average pore diameter of the porous material, respectively. The columns of the "Volume Percentage of Pores ≤10 μm" and "Volume Percentage of Pores ≥40 μm" indicate the volume percentages of such pores in the porous material, respectively. The columns of the "Bending Strength," "Young's Modulus" and "Thermal Expansion Coefficient" indicate the bending strength, Young's modulus and thermal expansion coefficient of the porous material, respectively. The column of the "Strength/Young's Modulus Ratio" indicates a value that is obtained by dividing the bending strength (Pa) by the Young's modulus (Pa). The column of the "Specific Heat Capacity" indicates the specific heat capacity of the porous material at room temperature.

In the column of the "Total Evaluation" of Table 1, A to C represent acceptable and D represents unacceptable. Among the A to C evaluations, A represents the best thermal shock resistance, B represents the next best to A in the thermal shock resistance, and C represents the next best to B in thermal shock resistance. D represents inferior or bad in the thermal shock resistance. The total evaluation A requires the bending strength equal to or greater than 10 MPa, the thermal expansion coefficient equal to or smaller than 4.6 ppm/K, the strength/Young's modulus ratio equal to or greater than 1.6, and the specific heat capacity equal to or greater than 2.05 J/(cm$^3$·K). The total evaluation B requires the bending strength equal to or greater than 5.0 MPa, the thermal expansion coefficient equal to or smaller than 4.6 ppm/K, the strength/Young's modulus ratio equal to or greater than 1.6, and the specific heat capacity equal to or greater than 2.05 J/(cm$^3$·K). The total evaluation C requires the bending strength greater than 3 MPa, the thermal expansion coefficient equal to or smaller than 4.6 ppm/K, and the specific heat capacity equal to or greater than 2.05 J/(cm$^3$·K). The total evaluation D requires at least one of the bending strength equal to or less than 3 MPa, and the thermal expansion coefficient greater than 4.6 ppm/K.

Contents of the Aggregate and the Composite Binder

When the aggregate is the silicon carbide, the chemical analysis (ICP-AES method) is carried out, and the amount of silicon carbide is calculated on the assumption that all the determined quantity of C (carbon) derives from silicon carbide. When the aggregate is silicon nitride, the amount of silicon nitride is calculated on the assumption that all the quantity of nitrogen (N) that is determined by a method based on JIS R 1603 derives from silicon nitride. When no metallic silicon is contained in the composite binder, the content of the composite binder is calculated on the assumption that the only component of the porous material, except for the aggregate, is the composite binder. When the metallic silicon is contained in the composite binder, the content of the composite binder is obtained in the following manner. Firstly, an amount of oxide component except for Si is calculated. Then, an amount of oxide that is contained in the oxide component except for Si is subtracted from the amount of O (oxygen) determined by the chemical analysis, and the resulting amount of O (oxygen) is all taken as O (oxygen) in SiO$_2$ to determine the amount of SiO$_2$. Subsequently, Si contained in SiO$_2$ is subtracted from the amount of Si that is determined by the chemical analysis, and the resulting amount of Si is taken as the amount of metallic silicon. Then, a sum of the aggregates (SiC, Si$_3$N$_4$) and the metallic silicon is subtracted from the amount of the entire porous material to obtain the content of the composite binder.

Mass Percentages of Respective Components in the Composite Binder

Mass percentages of the respective components (glass, mullite particle and crystalline component) in the composite binder of the porous material (honeycomb structure) are obtained in the following manner. Firstly, a plurality of powder samples that contain glass and mullite are prepared with an amount of mullite to an amount of glass being altered. A plurality of another powder samples that contain glass and cordierite (reference material) are prepared with an amount of cordierite to an amount of glass being altered. The prepared samples undergo the X-ray diffraction measurement. The obtained X-ray diffraction pattern is used to calculate the ratio of the maximum height of the halo pattern representative of the glass to the diffraction peak height of the (110) plane of the mullite to obtain an analytical curve. Then, the ratio of the maximum height of the halo pattern representative of glass to the diffraction peak height of the (100) plane of the cordierite is calculated to obtain another analytical curve. The samples of the Examples and Comparative Examples undergo the X-ray diffraction measurement, and the percentages of the respective components in the composite binder are calculated using the analytical curves. Then, the amount of binder in the porous material is divided (shared) on the basis of the respective component percentages to calculate the mass percentage of the respective components. The X-ray diffraction machine for use in this calculation is a rotating counter X-ray diffractometer (RINT manufactured by Rigaku Corporation, Japan). The X-ray diffraction measurement was carried out under the following conditions; CuK alpha source, 50 kV, 300 mA, and 2θ=10–60 degrees. The X-ray diffraction data analysis was carried out with the "X-ray Data Analyzing Software JADE7" made by MDI.

Mass Percentage of Metallic Silicon

The content of the metallic silicon in the porous material (honeycomb structure) is obtained by the ICP-AES (Inductively Coupled Plasma-Atomic Emission Spectrometry) method. Specifically, the amounts of SiC and SiO$_2$ are identified from Si, C and O measured by the ICP-AES method, and the determined amount of remaining Si is taken as the content of the metallic silicon.

Components in Glass

The respective components in glass (components of glass) are detected by the chemical analysis (ICP-AES method). Table 2 shows the names of the respective components in the glass, and percentages of CaO and Na$_2$O contained in the glass components.

Aspect Ratio of the Mullite Particle

The aspect ratio of the mullite particle (aspect ratio of mullite) is measured using an SEM (scanning electron microscope). Specifically, a cross section of a porous material enclosed by resin is mirror polished with a diamond slurry, and the resulting porous material is used as an observation sample. The polished cross section of the observation sample is observed at a magnification of 3000×, and a microstructure photograph is taken. The major lengths and minor lengths of all the mullite particles in the microstructure photograph are measured to calculate the "major length/minor length" ratio. Then, this ratio is averaged by the number of the mullite particles in the microstructure photograph to obtain the aspect ratio of mullite.

Major Length of Mullite Particle

The major length of the mullite particle is measured with the SEM (scanning electron microscope). Specifically, a cross section of the porous material enclosed by resin is mirror polished with the diamond slurry, and the resulting porous material is used as an observation sample. The polished cross section of the observation sample is observed at a magnification of 3000×, and a microstructure photograph is taken. The major lengths of all the mullite particles in the microstructure photograph are measured, and are averaged by the number of the mullite particles in the microstructure photograph to obtain the major length of the mullite particle (major length of mullite).

Porosity

The porosity is calculated from the entire pore volume ($cm^3/g$) measured by the mercury press-in method (based on JIS R 1655) and the apparent density ($g/cm^3$) measured by the Archimedes method. The porosity is calculated with the following equation; Porosity (%)=100× the entire pore volume/ {(1/apparent density)+the entire pore volume}. The measurement of the entire pore volume (by the mercury press-in method) is carried out with a test sample having 3-cell (height)×3-cell (width)×20 mm (length), which is cut out from the honeycomb structure. The measurement of the apparent density (by the Archimedes method) is carried out with a test sample having a size of 20 mm×20 mm×0.3 mm, which is cut from the honeycomb structure. This sample is almost one partition wall of 20 mm×20 mm.

Average Pore Diameter

A test sample having a size of 3-cell (height)×3-cell (width)×20 mm (length) is cut from the honeycomb structure, and the average pore diameter is measured by the mercury press-in method (based on JIS R. 1655).

Pore Volume Percentage

The "Volume Percentage of Pores ≤10 μm" and the "Volume Percentage of Pores ≥40 μm" are measured in the following manner. Used is the same sample as that used for the measurement of the average pore diameter. The entire pore volume, the pore volume of those pores which have a pore diameter equal to or greater than 40 micrometers, and the pore volume of those pores which have a pore diameter equal to or smaller than 10 micrometers are measured by the mercury press-in method (based on JIS R 1655). Then, the "Volume Percentage of Pores ≤10 μm" is calculated by dividing the pore volume of those pores which have a pore diameter equal to or smaller than 10 micrometers by the entire pore volume, and the "Volume Percentage of Pores ≥40 μm" is calculated by dividing the pore volume of those pores which have a pore diameter equal to or greater than 40 micrometers by the entire pore volume.

Bending Strength (Strength)

Part of the honeycomb structure is machined to a test sample that is elongated in a cell extending direction with a size of 0.3 mm (height)×4 mm (width)×40 mm (length). The test sample undergoes the bending test based on JIS R1601 to calculate the bending strength.

Young's Modulus

The measurement method used for the above-described "Bending Strength" is also used to prepare a stress-strain curve, and an inclination of the stress-strain curve is calculated. The obtained inclination of the stress-strain curve is taken as the Young's modulus.

Thermal Expansion Coefficient

A method based on JIS R1618 is used. Prepared is a test sample which is cut from the honeycomb structure with a size of 3-cell (height)×3-cell (width)×20 mm (length). The average linear thermal expansion coefficient (thermal expansion coefficient) is measured in the A axis direction (direction parallel to a passage in the honeycomb structure) at 40 to 800 degrees C.

Specific Heat Capacity

A disc-shaped measurement sample having a diameter of 5 mm and a thickness of 1.0 mm is cut from the outer peripheral wall of the honeycomb structure. This measurement sample is used to measure a specific heat at room temperature by a method based on JIS R1611. In addition, the apparent density of the measurement sample is measured by the Archimedes method. The product of the specific heat and the apparent density is taken as the specific heat capacity ($J/(cm^3·K)$).

TABLE 1

| | Aggregates SiC Mass % | Binder | | | | Metallic Silicon Mass % | Mullite Aspect Ratio | Mullite Major Length μm | Porosity % | Average Pore Diameter μm |
|---|---|---|---|---|---|---|---|---|---|---|
| | | Glass Mass % | Mullite Mass % | Other Crystalline Components Mass % | Binder Total Mass % | | | | | |
| Example 1 | 95.0 | 4.0 | 1.0 | 0.0 | 5.0 | 0.00 | 3.4 | 2.3 | 65.0 | 18.0 |
| Example 2 | 90.3 | 8.6 | 1.1 | 0.0 | 9.7 | | 3.7 | 2.5 | 63.6 | 16.79 |
| Example 3 | 89.8 | 8.2 | 2.0 | 0.0 | 10.2 | | 3.0 | 2.0 | 64.2 | 18.24 |
| Example 4 | 88.9 | 7.2 | 3.9 | 0.0 | 11.1 | | 2.1 | 1.8 | 63.8 | 16.04 |
| Example 5 | 71.7 | 24.8 | 3.5 | 0.0 | 28.3 | | 2.2 | 2.2 | 57.9 | 14.3 |
| Example 6 | 75.0 | 19.8 | 5.2 | 0.0 | 25.0 | | 2.3 | 2.2 | 54.0 | 12.5 |
| Example 7 | 74.0 | 15.0 | 5.4 | 5.6 | 26.0 | | 3.4 | 30.1 | 56.3 | 20.1 |
| Example 8 | 74.3 | 17.2 | 5.5 | 3.0 | 25.7 | | 3.2 | 24.8 | 55.5 | 19.9 |
| Example 9 | 74.3 | 16.5 | 5.0 | 4.2 | 25.7 | | 2.8 | 25.0 | 55.7 | 19.9 |
| Example 10 | 72.8 | 20.1 | 5.5 | 1.6 | 27.2 | | 2.1 | 2.0 | 53.2 | 11.3 |
| Example 11 | 74.4 | 18.0 | 5.2 | 2.4 | 25.6 | | 2.8 | 25.0 | 62.5 | 17.5 |
| Example 12 | 74.2 | 17.8 | 5.0 | 3.0 | 25.8 | | 2.7 | 24.5 | 63.0 | 18.0 |
| Example 13 | 74.2 | 18.1 | 5.1 | 2.6 | 25.8 | | 3.1 | 27.1 | 62.4 | 17.9 |
| Example 14 | 72.3 | 22.0 | 5.7 | 0.0 | 27.7 | | 2.8 | 25.0 | 62.6 | 17.0 |

TABLE 1-continued

| | | | | | | | | | |
|---|---|---|---|---|---|---|---|---|---|
| Example 15 | 74.0 | 20.8 | 5.2 | 0.0 | 26.0 | 3.1 | 27.1 | 62.0 | 18.2 |
| Example 16 | 87.1 | 12.5 | 0.4 | 0.0 | 12.9 | 2.9 | 1.5 | 64.5 | 16.4 |
| Example 17 | 53.4 | 36.5 | 10.1 | 0.0 | 46.6 | 4.3 | 4.0 | 48.2 | 15.0 |
| Example 18 | $Si_3N_4$ 66.5 | 28.5 | 5.0 | 0.0 | 33.5 | 2.3 | 2.2 | 52.6 | 14.8 |
| Comparative Example 1 | 94.1 | 5.9 | 0.0 | 0.0 | 5.9 | None | | 67.1 | 18.43 |
| Comparative Example 2 | 87.6 | 12.4 | 0.0 | 0.0 | 12.4 | None | | 65.2 | 18.27 |
| Comparative Example 3 | 88.5 | 10.3 | 0.0 | 1.2 | 11.5 | None | | 62.6 | 15.4 |
| Comparative Example 4 | 86.6 | 7.4 | 0.0 | 6.0 | 13.4 | None | | 60.5 | 12.3 |
| Comparative Example 5 | 74.2 | 20.6 | 0.0 | 5.2 | 25.8 | None | | 61.2 | 16.2 |

| | Volume Percentage of Pores ≤10 μm % | Volume Percentage of Pores ≥40 μm % | Bending Strength MPa | Young's Modulus GPa | Strength/ Young's Modulus ×10$^{-3}$ | Thermal Expansion Coefficient ppm/K | Specific Heat Capacity at RT J/(cm$^3$·K) | Total Evaluation |
|---|---|---|---|---|---|---|---|---|
| Example 1 | 16.5 | 4.8 | 3.1 | 1.6 | 1.9 | 4.6 | 2.20 | C |
| Example 2 | 17.0 | 5.9 | 3.2 | 1.7 | 2.0 | 4.5 | 2.12 | C |
| Example 3 | 17.4 | 6.2 | 5.1 | 3.2 | 1.6 | 4.5 | 2.13 | B |
| Example 4 | 18.7 | 5.6 | 5.2 | 3.3 | 1.6 | 4.5 | 2.12 | B |
| Example 5 | 9.7 | 4.4 | 16.3 | 9.2 | 1.8 | 3.8 | 2.10 | A |
| Example 6 | 15.3 | 3.8 | 19.7 | 11.8 | 1.7 | 4.6 | 2.10 | A |
| Example 7 | 3.0 | 8.5 | 15.3 | 9.6 | 1.6 | 4.6 | 2.08 | A |
| Example 8 | 2.7 | 8.8 | 17.6 | 11.0 | 1.6 | 4.5 | 2.10 | A |
| Example 9 | 2.6 | 8.9 | 17.5 | 11.2 | 1.6 | 4.6 | 2.10 | A |
| Example 10 | 4.7 | 24.3 | 23.4 | 13.3 | 1.8 | 4.3 | 2.08 | A |
| Example 11 | 7.2 | 6.8 | 12.1 | 6.6 | 1.9 | 4.1 | 2.07 | A |
| Example 12 | 7.1 | 6.8 | 10.3 | 5.9 | 1.8 | 4.0 | 2.06 | A |
| Example 13 | 6.5 | 6.6 | 12.7 | 6.8 | 1.9 | 4.0 | 2.07 | A |
| Example 14 | 7.6 | 6.4 | 10.6 | 5.5 | 1.9 | 4.6 | 2.10 | A |
| Example 15 | 6.4 | 7.9 | 11.6 | 5.4 | 2.2 | 4.5 | 2.08 | A |
| Example 16 | 15.8 | 6.2 | 5.0 | 2.6 | 1.9 | 4.4 | 2.17 | B |
| Example 17 | 13.7 | 6.0 | 17.2 | 19.0 | 0.9 | 4.2 | 2.06 | C |
| Example 18 | 14.1 | 6.3 | 11.1 | 5.0 | 2.2 | 3.4 | 2.10 | A |
| Comparative Example 1 | 13.2 | 7.6 | 2.0 | 1.2 | 1.7 | 4.5 | 2.06 | D |
| Comparative Example 2 | 13.4 | 7.1 | 2.9 | 1.5 | 1.9 | 4.2 | 2.08 | D |
| Comparative Example 3 | 21.1 | 6.9 | 2.0 | 1.1 | 1.8 | 4.8 | 2.07 | D |
| Comparative Example 4 | 35.6 | 6.1 | 1.8 | 1.2 | 1.5 | 5.1 | 2.08 | D |
| Comparative Example 5 | 18.5 | 6.2 | 4.2 | 2.6 | 1.6 | 4.8 | 2.10 | D |

TABLE 2

| | Components of Glass | CaO Content Mass % | Na$_2$O Content Mass % |
|---|---|---|---|
| Example 1 | MgO, Al$_2$O$_3$, SiO$_2$ | <0.1 | <0.1 |
| Example 2 | MgO, Al$_2$O$_3$, SiO$_2$, CaO | 0.10 | <0.1 |
| Example 3 | MgO, Al$_2$O$_3$, SiO$_2$, CaO | 0.11 | <0.1 |
| Example 4 | MgO, Al$_2$O$_3$, SiO$_2$, CaO | 0.12 | <0.1 |
| Example 5 | MgO, Al$_2$O$_3$, SiO$_2$, CaO | 0.11 | <0.1 |
| Example 6 | MgO, Al$_2$O$_3$, SiO$_2$, Na$_2$O, CaO | 0.10 | 0.24 |
| Example 7 | MgO, Al$_2$O$_3$, SiO$_2$, Na$_2$O, CaO | 0.11 | 0.27 |
| Example 8 | MgO, Al$_2$O$_3$, SiO$_2$, Na$_2$O, CaO | 0.10 | 0.26 |
| Example 9 | MgO, Al$_2$O$_3$, SiO$_2$, Na$_2$O, CaO | 0.11 | 0.35 |
| Example 10 | MgO, Al$_2$O$_3$, SiO$_2$, Na$_2$O, CaO | 0.11 | 0.32 |
| Example 11 | MgO, Al$_2$O$_3$, SiO$_2$, Na$_2$O, CaO | 0.10 | 0.36 |
| Example 12 | MgO, Al$_2$O$_3$, SiO$_2$, Na$_2$O, CaO | 0.10 | 0.28 |
| Example 13 | MgO, Al$_2$O$_3$, SiO$_2$, Na$_2$O, CaO | 0.11 | 0.30 |
| Example 14 | MgO, Al$_2$O$_3$, SiO$_2$, CaO | 0.10 | <0.1 |
| Example 15 | MgO, Al$_2$O$_3$, SiO$_2$, CaO | 0.10 | <0.1 |
| Example 16 | MgO, Al$_2$O$_3$, SiO$_2$, CaO | 0.12 | <0.1 |
| Example 17 | MgO, Al$_2$O$_3$, SiO$_2$, CaO | 0.11 | <0.1 |
| Example 18 | MgO, Al$_2$O$_3$, SiO$_2$, Na$_2$O, CaO | 0.11 | 0.30 |
| Comparative Example 1 | MgO, Al$_2$O$_3$, SiO$_2$ | <0.1 | <0.1 |
| Comparative Example 2 | MgO, Al$_2$O$_3$, SiO$_2$ | <0.1 | <0.1 |
| Comparative Example 3 | MgO, Al$_2$O$_3$, SiO$_2$ | <0.1 | <0.1 |
| Comparative Example 4 | MgO, Al$_2$O$_3$, SiO$_2$ | <0.1 | <0.1 |
| Comparative Example 5 | MgO, Al$_2$O$_3$, SiO$_2$ | <0.1 | <0.1 |

TABLE 3

| | Aggregates SiC Mass % | Binder | | | Binder Total Mass % | Metallic Silicon Mass % | Binder Raw Material | |
|---|---|---|---|---|---|---|---|---|
| | | Glass Mass % | Mullite Mass % | Other Crystalline Components Mass % | | | Talc Mass % | Aluminum Hydroxide Mass % |
| Example 1 | 95.0 | 4.0 | 1.0 | 0.0 | 5.0 | 0.00 | 31.3 | 48.8 |
| Example 2 | 90.3 | 8.6 | 1.1 | 0.0 | 9.7 | | 31.3 | 48.8 |
| Example 3 | 89.8 | 8.2 | 2.0 | 0.0 | 10.2 | | 27.0 | 53.0 |
| Example 4 | 88.9 | 7.2 | 3.9 | 0.0 | 11.1 | | 21.0 | 58.9 |
| Example 5 | 71.7 | 24.8 | 3.5 | 0.0 | 28.3 | | 27.0 | 53.0 |
| Example 6 | 75.0 | 19.8 | 5.2 | 0.0 | 25.0 | | 27.0 | 53.0 |
| Example 7 | 74.0 | 15.0 | 5.4 | 5.6 | 26.0 | | 27.0 | 53.0 |
| Example 8 | 74.3 | 17.2 | 5.5 | 3.0 | 25.7 | | 27.0 | 53.0 |
| Example 9 | 74.3 | 16.5 | 5.0 | 4.2 | 25.7 | | 27.0 | 53.0 |
| Example 10 | 72.8 | 20.1 | 5.5 | 1.6 | 27.2 | | 27.0 | 53.0 |
| Example 11 | 74.4 | 18.0 | 5.2 | 2.4 | 25.6 | | 27.0 | 53.0 |
| Example 12 | 74.2 | 17.8 | 5.0 | 3.0 | 25.8 | | 27.0 | 53.0 |
| Example 13 | 74.2 | 18.1 | 5.1 | 2.6 | 25.8 | | 27.0 | 53.0 |
| Example 14 | 72.3 | 22.0 | 5.7 | 0.0 | 27.7 | | 27.0 | 53.0 |
| Example 15 | 74.0 | 20.8 | 5.2 | 0.0 | 26.0 | | 27.0 | 53.0 |
| Example 16 | 87.1 | 12.5 | 0.4 | 0.0 | 12.9 | | 34.6 | 45.5 |
| Example 17 | 53.4 | 36.5 | 10.1 | 0.0 | 46.6 | | 21.0 | 58.9 |
| Example 18 | Si$_3$N$_4$ 66.5 | 28.5 | 5.0 | 0.0 | 33.5 | | 27.0 | 53.0 |
| Comparative Example 1 | 94.1 | 5.9 | 0.0 | 0.0 | 5.9 | | 35.9 | 44.3 |
| Comparative Example 2 | 87.6 | 12.4 | 0.0 | 0.0 | 12.4 | | 35.9 | 44.3 |
| Comparative Example 3 | 88.5 | 10.3 | 0.0 | 1.2 | 11.5 | | 39.9 | 49.2 |
| Comparative Example 4 | 86.6 | 7.4 | 0.0 | 6.0 | 13.4 | | 24.9 | 61.4 |
| Comparative Example 5 | 74.2 | 20.6 | 0.0 | 5.2 | 25.8 | | 60.8 | 35.7 |

| | Binder Raw Material | | Component Percentage in Binder Raw Material | | |
|---|---|---|---|---|---|
| | Silica Mass % | Magnesium Hydroxide Mass % | Aluminum Oxide Component Mass % | Silicon Dioxide Component Mass % | Magnesium Oxide Component Mass % |
| Example 1 | 20.0 | 0.0 | 39.0 | 48.7 | 12.2 |
| Example 2 | 20.0 | | 39.0 | 48.7 | 122 |
| Example 3 | 20.0 | | 43.1 | 46.2 | 10.7 |
| Example 4 | 20.1 | | 48.9 | 42.5 | 8.5 |
| Example 5 | 20.0 | | 43.1 | 46.2 | 10.7 |
| Example 6 | 20.0 | | 43.1 | 46.2 | 10.7 |
| Example 7 | 20.0 | | 43.1 | 46.2 | 10.7 |
| Example 8 | 20.0 | | 43.1 | 46.2 | 10.7 |
| Example 9 | 20.0 | | 43.1 | 46.2 | 10.7 |
| Example 10 | 20.0 | | 43.1 | 46.2 | 10.7 |
| Example 11 | 20.0 | | 43.1 | 46.2 | 10.7 |
| Example 12 | 20.0 | | 43.1 | 46.2 | 10.7 |
| Example 13 | 20.0 | | 43.1 | 46.2 | 10.7 |
| Example 14 | 20.0 | | 43.1 | 46.2 | 10.7 |
| Example 15 | 20.0 | | 43.1 | 46.2 | 10.7 |
| Example 16 | 19.9 | | 36.0 | 50.6 | 13.4 |
| Example 17 | 20.1 | | 48.9 | 42.5 | 8.5 |
| Example 18 | 20.0 | | 43.1 | 46.2 | 10.7 |
| Comparative Example 1 | 19.9 | | 34.9 | 51.4 | 13.8 |
| Comparative Example 2 | 19.9 | | 34.9 | 51.4 | 13.8 |
| Comparative Example 3 | 10.9 | | 39.7 | 44.7 | 15.7 |
| Comparative Example 4 | 2.3 | 11.4 | 54.2 | 24.4 | 21.4 |
| Comparative Example 5 | 3.5 | 0.0 | 27.6 | 49.5 | 22.9 |

Examples 2-18 and Comparisons 1-5

The porous materials (honeycomb structure bodies) were fabricated in a similar manner to Example 1, with the conditions being changed to those shown in Tables 1-3. Evaluations were made in a similar manner to Example 1. Results are shown in Table 1. It should be noted that in Example 18 silicon nitride ($Si_3N_4$) was used as aggregates, and the silicon carbide (SiC) was not used.

It is understood from Table 1 that the porous materials of Examples 1-18 have an excellent thermal shock resistance. It is also understood that the porous materials of Comparative Examples 1-5 have an inferior thermal shock resistance.

INDUSTRIAL APPLICABILITY

The porous material of the present invention can be used as a material for a catalyst carrier, a material for a DPF (diesel particulate filter) and for other use. The honeycomb structure of the present invention can be used as a catalyst carrier, a DPF and other devices.

REFERENCE NUMERALS

1: Aggregate
2: Reinforcing particle
3: Binder
4: Pores
5: Composite binder
100: Porous material

What is claimed is:
1. A porous material comprising:
   aggregates; and
   a composite binder which includes (i) glass as a binder and (ii) mullite particles as reinforcing particles such that the mullite particles are dispersed in and surrounded by the glass,
   wherein the aggregates are bound together by the composite binder in a state where pores are formed, by the aggregates and the composite binder, in the porous material, and
   wherein the glass contains MgO, $Al_2O_3$ and $SiO_2$ and further contains at least one that is selected from a group consisting of $Na_2O$, $K_2O$ and CaO.
2. The porous material according to claim 1,
   wherein a lower limit of a percentage of a content of the composite binder to a total mass of the aggregates and composite binder is 12 mass %, and an upper limit of the percentage of the content of the composite binder to the total mass of the aggregates and composite binder is 50 mass %.
3. The porous material according to claim 1,
   wherein a lower limit of a percentage of a content of the mullite particles to a total mass of the aggregates and composite binder is 0.5 mass %, and an upper limit of the percentage of the content of the mullite particles to the total mass of the aggregates and composite binder is 15 mass %.
4. The porous material according to claim 2,
   wherein a lower limit of a percentage of a content of the mullite particles to a total mass of the aggregates and composite binder is 0.5 mass %, and an upper limit of the percentage of the content of the mullite particles to the total mass of the aggregates and composite binder is 15 mass %.
5. The porous material according to claim 1,
   wherein a lower limit of a major length of the mullite particle, which is the reinforcing particle, is 0.5 micrometer, and an upper limit of the major length of the mullite particle is 35 micrometers.
6. The porous material according to claim 1,
   wherein the aggregates contain at least one of silicon carbide (SiC) particle and silicon nitride ($Si_3N_4$) particle.
7. The porous material according to claim 1, wherein a lower limit of a porosity is 40%, and an upper limit of the porosity is 90%.
8. The porous material according to claim 1,
   wherein pores having a diameter less than 10 micrometers are included at 20% or less in the entire pores, and pores having a diameter greater than 40 micrometers are included at 10% or less in the entire pores.
9. The porous material according to claim 1,
   wherein a bending strength of the porous material is equal to or greater than 6.5 MPa, and a bending strength/Young's modulus ratio is equal to or greater than $1.4 \times 10^{-3}$.
10. The porous material according to claim 1,
    wherein a thermal expansion coefficient of the porous material is equal to or lower than $4.6 \times 10^{-6}$/K.
11. The porous material according to claim 1,
    wherein a lower limit of a percentage of a content of the composite binder to a total mass of the aggregates and composite binder is 12 mass %, and an upper limit of the percentage of the content of the composite binder to the total mass of the aggregates and composite binder is 50 mass %,
    the glass contains MgO, $Al_2O_3$ and $SiO_2$ and further contains at least one that is selected from a group consisting of $Na_2O$, $K_2O$ and CaO,
    a lower limit of a percentage of a content of the mullite particles to a total mass of the aggregates and composite binder is 0.5 mass %, and an upper limit of the percentage of the content of the mullite particles to the total mass of the aggregates and composite binder is 15 mass %, and
    the aggregates contain at least one of silicon carbide (SiC) particle and silicon nitride ($Si_3N_4$) particle.
12. A honeycomb structure configured with the porous material that is defined in claim 1,
    wherein the honeycomb structure has a partition wall that defines a plurality of cells extending from one end face to another end face.
13. A honeycomb structure configured with the porous material that is defined in claim 2,
    wherein the honeycomb structure has a partition wall that defines a plurality of cells extending from one end face to another end face.
14. A honeycomb structure configured with the porous material that is defined in claim 11,
    wherein the honeycomb structure has a partition wall that defines a plurality of cells extending from one end face to another end face.
15. The honeycomb structure according to claim 12,
    wherein the honeycomb structure further comprises plugging portions at openings of predetermined cells at said one end face, and another plugging portions at openings of the remaining cells at said another end face.
16. The honeycomb structure according to claim 13,
    wherein the honeycomb structure further comprises plugging portions at openings of predetermined cells at said one end face, and another plugging portions at openings of the remaining cells at said another end face.

17. A method of fabricating a porous material comprising:
    extruding a forming raw material which contains an aggregate raw material, a composite binder raw material, a pore former and a binder to prepare a formed body; and
    sintering the formed body in an inert atmosphere to fabricate the porous material, with a lower limit of a sintering temperature in the sintering being 1300 degrees C. and an upper limit of the sintering temperature being 1600 degrees C.,
    wherein the composite binder raw material contains an aluminum oxide component at more than 34.9 mass % and less than 71.8 mass %, a silicon dioxide component at more than 28.2 mass % and less than 52.0 mass %, and a magnesium oxide component at more than 5.00 mass % and less than 13.8 mass %, and
    wherein the porous material comprises aggregates and a composite binder which includes (i) glass as a binder and (ii) mullite particles as reinforcing particles such that the mullite particles are dispersed in and surrounded by the glass, wherein the aggregates are bound together by the composite binder in a state where pores are formed, by the aggregates and the composite binder, in the porous material, and wherein the glass contains $MgO$, $Al_2O_3$ and $SiO_2$ and further contains at least one that is selected from a group consisting of $Na_2O$, $K_2O$ and $CaO$.

* * * * *